US006961141B2

(12) United States Patent
Szumla

(10) Patent No.: US 6,961,141 B2
(45) Date of Patent: Nov. 1, 2005

(54) METHOD AND ELECTRONIC APPARATUS FOR FORMATTING AND SERVING INKJET IMAGE DATA

(75) Inventor: Thomas P. Szumla, Lockport, NY (US)

(73) Assignee: Eastman Kodak Company, Rochester, NY (US)

(*) Notice: Subject to any disclaimer, the term of this patent is extended or adjusted under 35 U.S.C. 154(b) by 989 days.

(21) Appl. No.: 09/745,027

(22) Filed: Dec. 20, 2000

(65) Prior Publication Data

US 2001/0017703 A1 Aug. 30, 2001

Related U.S. Application Data

(63) Continuation-in-part of application No. 09/512,913, filed on Feb. 25, 2000, now Pat. No. 6,509,978.

(51) Int. Cl.[7] ............................ G06K 15/00; H04N 1/32
(52) U.S. Cl. ........................ 358/1.15; 358/468; 358/442
(58) Field of Search ................................ 358/1.15, 463, 358/468, 448, 443, 404, 444, 512, 530, 452, 461, 442

(56) References Cited

U.S. PATENT DOCUMENTS

| 4,065,661 A | * | 12/1977 | Jaskowsky | 705/400 |
| 4,562,537 A | | 12/1985 | Barnett et al. | 712/221 |
| 4,648,045 A | | 3/1987 | Demetrescu | 345/505 |
| 5,237,655 A | | 8/1993 | Statt et al. | 345/504 |
| 5,262,875 A | | 11/1993 | Mincer et al. | 386/101 |
| 5,689,313 A | | 11/1997 | Sotheran | 348/715 |
| 5,740,388 A | | 4/1998 | Hunt | 715/723 |
| 6,061,150 A | | 5/2000 | Yamamoto | |
| 6,229,620 B1 | * | 5/2001 | Makitani et al. | 358/1.15 |
| 6,411,742 B1 | * | 6/2002 | Peterson | 382/284 |
| 6,509,978 B1 | | 1/2003 | Szumla | 358/1.8 |

FOREIGN PATENT DOCUMENTS

| EP | 0 562 467 A | 9/1993 |
| EP | 0 782 049 A | 7/1997 |
| EP | 0 938 139 A2 | 8/1999 |
| JP | 2000020275 | * 1/2000 ............ G06F/3/12 |
| WO | WO 00/36488 | 6/2000 |

OTHER PUBLICATIONS

U.S. Appl. No. 09/512,913, filed Jan. 21, 2003, Szumla.

* cited by examiner

*Primary Examiner*—Jerome Grant, II
(74) *Attorney, Agent, or Firm*—Norman Rushefsky; Mark G. Bocchetti

(57) ABSTRACT

In connection with a host processing system (90) capable of delivering commands and raw image data, an apparatus (100) for formatting raw image data and selectively delivering enhanced image data to a print processing subsystem (92). An image data bus section (120) comprises an image bus interface (122) coupled to a host processing system (90) configured to transmit raw image data, a front end memory (124) coupled to the image bus interface (122) to receive the raw image data, a back end memory (126) for receiving the enhanced image data, and a print processing subsystem (92) coupled to the back end memory (126) via a print interface (128) for transmitting print data based on the enhanced image data. A processor bus section (140) comprises an image processor (146) and a processor bus interface (142) adapted to be coupled to the host processing system (90) in order to communicate print processing instructions between the print processor (146) and the computer (90). A gateway (160) couples the print processor (146) to the front end memory (124) and the back end memory (126) whereby the print processor (146) receives the raw image data from the front end memory (124), formats the image data, and transmits the enhanced image data to the back end memory (126). The image data signals and the processor instruction signals are separated and transmitted over separate buses and bus interfaces to minimize processor I/O wait states and parasitic capacitance.

36 Claims, 4 Drawing Sheets

METHOD AND ELECTRONIC APPARATUS FOR FORMATTING AND SERVING INKJET IMAGE DATA

RELATED APPLICATIONS

This application is a continuation in part of U.S. application Ser. No. 09/512,913 dated Feb. 25, 2000, now U.S. Pat. No. 6,509,978.

FIELD OF THE INVENTION

The invention relates to image processing and more particularly to a method and apparatus for formatting bitmapped data for a printer, such as an inkjet printer.

BACKGROUND OF THE INVENTION

Without limiting the scope of the invention, its background is described in connection with inkjet printers, as an example.

It is well known to format bitmapped image data for output by a printer, such as an inkjet printer, that scans one or more printheads over a receiver medium, such as a sheet of paper. Each printhead can include a plurality of nozzles, i.e. ink orifices, to allow color printing by printing dots of different colors in proximity to, or on top of, one another. For example, if the "CMYK" model is used, orifices for each of the colors (e.g., cyan, magenta, yellow and black) are used in combination to make various colors. The words "bitmap" and "bitmapped" as used herein refer to a representation, consisting of rows and columns of dots, of a graphics image in computer memory. To display a bitmapped image on a monitor or to print it on a printer, the computer formats the bitmapped data into pixels (for display screens) or ink dots (for printers).

During formatting, the bitmapped image data may be subjected to "pixel swath extraction" in which the pixels (i.e., ink dots) are ordered to be associated with a particular printhead. Also, the bitmapped image data may be subjected to "nozzle data rendering" in which inkjet nozzle drop data is created based on gray scale data or color gamut data Pixel swath extraction and nozzle data rendering is ordinarily accomplished by an image processor, which reads the bitmapped image out of a memory and formats the data in a known manner. Additionally, the image processor can accomplish error correction and diagnostics based on instructions from the computer generating the image data.

Presently, a conventional bitmapped image data formatting apparatus is utilized. Since a single bus interface and a single local communications bus is used to carry both image data and processing instructions, the processor will have many wait states while it waits for image data to be communicated. Further, the architecture in which a plurality of elements (e.g., the bus interface, the processor, and any buffers, accumulators, or other elements) are disposed in a single data path, presents a high capacitance of the system. Both of these factors serve to slow down the effective formatting speed of the conventional apparatus and cause the computer user to wait. Accordingly, a need exists for an apparatus configured to speed up formatting of bitmapped image data for printing.

A need also exists for a device providing separate addressing and control interface, so as to efficiently utilize the time on the device to transfer actual data. Currently, many boards are designed to be general purpose. As such, the boards have one local bus and no separate buffering, causing all peripheral devices and memory devices to be hung off this one local bus. Thus, the one bus exists with more capacitance. Accordingly, a need exists for an apparatus configured to minimize capacitance in order to provide for best data transfer rates.

SUMMARY OF THE INVENTION

The present invention provides an apparatus for formatting the raw image data and selectively delivering enhanced image data to a print processing subsystem in connection with a host processing system capable of delivering commands and raw image data. With the present invention, the speed of formatting a bitmapped image for printing is increased, thereby reducing the amount of wait states experienced by the conventional apparatus, as well as the computer user.

Accordingly, disclosed in one embodiment is an apparatus for formatting raw image data and selectively delivering enhanced image data to a print processing subsystem in connection with a host processing system capable of delivering commands and raw image data. The host processing system in which this invention may be embedded can be either a desk top personal computer, an industrial type computer, or a custom implementation such as a Fiery system. The apparatus comprises a first interface, a second interface, and a third interface. A first interface is coupled to the host processing system and is adapted to receive the raw image data. In one embodiment, the first interface is an image bus interface identified as a special bus write function and is adapted to transmit the raw image data to a memory for temporary storage. A second interface is also coupled to the host processing system and is adapted to receive commands from the host processing system and transmits status and error information (if required). In one embodiment, the second interface is a processor bus interface coupled to the host processing system. The second or processor bus interface, thus, is adapted to communicate processing instructions between an image processor and the host processing system.

The host processing system may consist of an embedded processor such as a Pentium, a Power PC or a Crusoe™. Either of these processors may be used in combination with a shared I/O bus, such as a Compact PCI bus, VME bus, LVDS bus or custom shared I/O bus implementation.

A third interface is coupled to the print processing subsystem. According to one embodiment, the third interface is a printer interface adapted to transmit print data based on the enhanced image data to the print processing subsystem.

The apparatus further comprises front end memory and back end memory, both comprising Random Access Memory (RAM). The front end memory is coupled to the first interface and is adapted to receive raw image data. The back end memory, which is communicably coupled the front end memory, is adapted to receive enhanced image data. As such, the back end memory is coupled to the third interface, or printer interface.

The apparatus also comprises a processor, such as an image processor, adapted to receive and transmit processing instructions to and from the host processing system. The processing instructions can include, but are not limited to, initialization commands, error information, diagnostic information, bad nozzle data for failed nozzle correction, and other instructions for processing a printjob. Read Only Memory (ROM) containing an image processing control program is coupled to the image processor, as well as Random Access Memory (RAM) which serves as a workspace for formatting of image data by the image processor.

A gateway communicably couples the processor to the front end memory and the back end memory. As such, the processor is configured to format the raw image data as read out of the front end memory and transmit the enhanced image data to the back end memory.

The apparatus further comprises an image data bus communicably coupled to a first local bus via the gateway. The image data bus couples the first interface to the front end memory, and the first local bus couples the second interface to the processor. In turn, a control data buffer is coupled to the first local bus, and a second local bus couples the control data buffer and a low speed communications device, such as a debug serial port. Thus, the low speed communications device is adapted to communicate with the control data buffer, is such as a bus transceiver.

The apparatus also comprises an image processor. The image processor is adapted to intercept the raw image data and apply a transformative function to the raw image data to produce enhanced image data. The image processor is further adapted to cause the enhanced image data to be delivered to the print processing subsystem via the third interface.

Disclosed in another embodiment is a device for formatting bitmapped image data for printing. The device comprises an image data bus section having an image bus interface adapted to be coupled to a computer bus to transmit the image data, a front end memory coupled to the image bus interface to receive the image data in an unformatted form (i.e., raw image data), a back end memory for receiving the image data in a formatted form, and a print device coupled to the back end memory for transmitting print data based on the image data in a formatted form (i.e., enhanced image data). The device also comprises a processor bus section having an image processor, a processor bus interface adapted to be coupled to the computer bus to communicate print processing instructions between the print processor and the computer, and a gateway coupling the image processor to the front end memory and the back end memory. The image processor receives the image data in an unformatted form from the front end memory, formats the image data, and transmits the image data in a formatted form to the back end memory.

Disclosed in yet another embodiment is a method for formatting bitmapped image data. Initially, raw image data is transmitted through an image bus interface coupled to a host processing system, or computer bus, to a front end memory coupled to the image bus interface in order to store the image data in an unformatted form. In one embodiment, the image bus interface is identified as a special bus write function. As such, handshaking between the image processor and the host processing system is accomplished through the processor bus interface.

Print processing instructions are then communicated to an image processor through a processor bus interface coupled to a host processing system.

In addition, control instructions are downloaded from a Read Only Memory (ROM) to the image processor. The raw image data is then transferred from the front end memory to the image processor through a gateway coupling the image processor to the front end memory.

Once transferred, the raw image data is formatted via the image processor. As such, the formatting step further includes the step of utilizing a Random Access Memory (RAM) coupled to the image processor as a workspace. Thus, the raw image data is formatted resulting in enhanced image data.

The enhanced image data is transferred to a back end memory. The method further comprises the steps of reading the enhanced image data out of the back end memory, then transmitting the enhanced image data readout from the back end memory to a print processing subsystem via a print interface. While being transmitted, the enhanced image data is divided into data for a plurality of printheads in the print interface. Thus, the enhanced image data is then delivered to a plurality of printheads.

Accordingly, the invention provides a processor architecture in which data and processor address signals are separated. Also, the invention provides a bus structure in which I/O wait states of the most utilized operations, such as instruction fetches from memory and stack variable access from memory, are minimized. The invention also provides the image data its own path as much as possible during formatting and provides concurrent operation of the processor and transfer of image data from the computer.

BRIEF DESCRIPTION OF THE DRAWINGS

For a more complete understanding of the present invention, including its features and advantages, reference is made to the following detailed description of the invention, taken in conjunction with the accompanying drawings in which.

Corresponding numerals and symbols in these figures refer to corresponding parts in the detailed description unless otherwise indicated.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. These specific embodiments discussed herein are merely illustrative of specific ways to make and use the invention, and do not delimit the scope or application of the invention.

Figure 1:
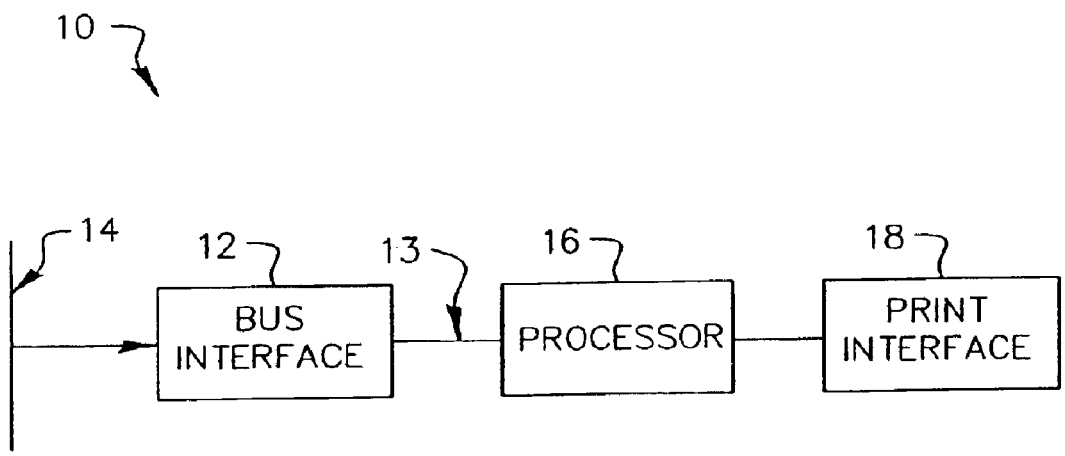
FIG. 1 is a block diagram of a conventional formatting apparatus.

Referring to FIG. 1 therein is shown a conventional bitmapped image data formatting apparatus denoted generally as 10. Ordinarily, the apparatus 10 is in the physical form of an expansion card that can fit into a slot defined in a host computer or computer chassis to interface with a shared communications bus of the computer or the computer chassis. For example, the apparatus can be of a configuration that fits into a PCI (peripheral component interconnect) slot to interface with a personal, industrial, RIP, (RIP =raster image processor), or custom computer having a PCI bus. Formatting apparatus 10 includes bus interface 12, which includes hardware and/or software for interfacing with bus 14 of the host computer in a known manner. For example, bus interface 12 can be a standard PCI interface. Image processor 16 is coupled to bus interface 12 by local communications bus 13 to obtain bitmapped image data output by the computer and to obtain processing instructions from the computer, such as correction instructions and diagnostics, through the bus interface 12. After being formatted by processor 16, the image data is sent to print interface 18 in a known manner. Interface 18 is associated with one or plural printheads or print engines of the printer (not illustrated) and outputs data for the printheads or print engines in an appropriate protocol, such as Centronix serial, USB (universal serial bus), parallel, or the like, depending on the interface of the printer.

Figure 2:
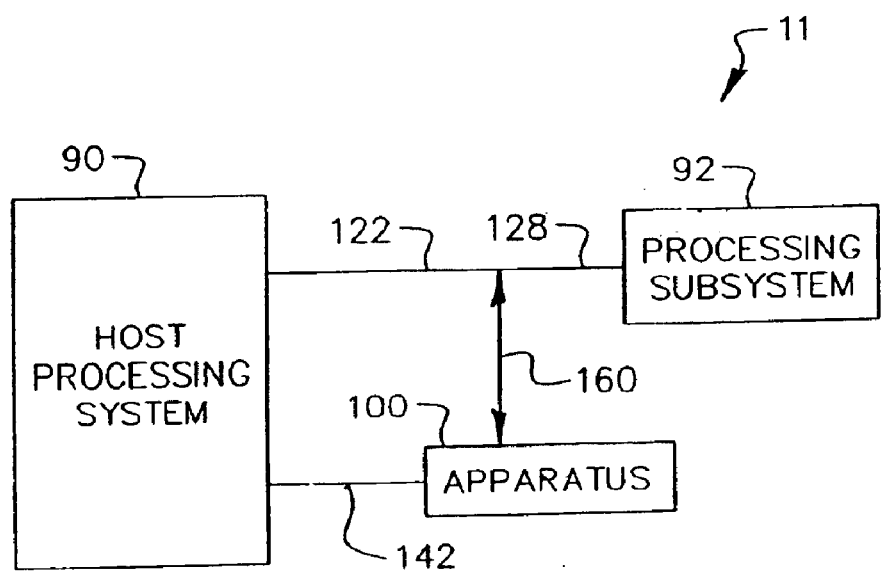
FIG. 2 depicts a block diagram of a system in which the present invention can be implemented.
Figure 3:
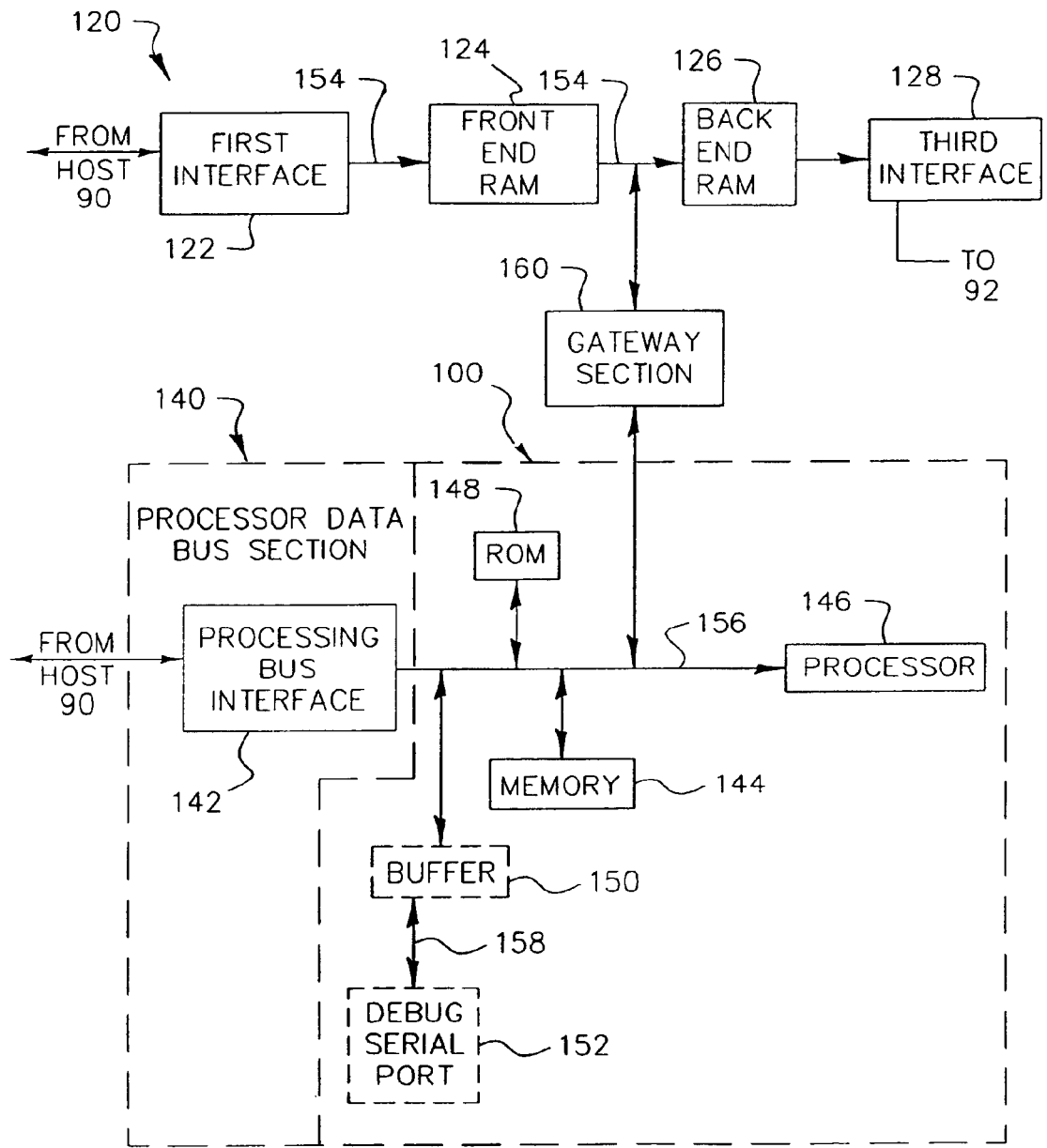
FIG. 3 is a block diagram of a formatting card, in accordance with a preferred embodiment of the present invention.

With reference to FIG. 2, therein is shown a block diagram of a system in which the present invention can be implemented. The system, denoted generally as 11, comprises an apparatus 100 (as shown in FIG. 3) for formatting raw image data and selectively delivering enhanced image data to a print processing subsystem 92. The host processing system 90, in connection with the apparatus 100, is capable of delivering commands and raw image data.

System 11 further comprises a first, second and third interface, 122, 142 and 128, respectively for transmitting image data in unformatted and formatted form. In particular, first interface 122 is coupled to the host processing system 90 and is adapted for receiving the raw image data. The second interface 142 is also coupled to host processing system 90, but is adapted for receiving commands. That is, second interface 142 communicates processing instructions between a processor (as shown in FIG. 3) and the host processing system 90.

The third interface 128 is coupled to a print processing subsystem 92, as well as to back end memory (as shown in FIG. 3). Thus, third interface 128 is adapted to transmit print data based on the formatted or enhanced image data to the print processing subsystem 92.

In operation, an image processor (not shown) intercepts the raw image data received from the host processing system 90 and applies a transformative function to the raw image data. The raw image data is transmitted via a gateway 160 to the apparatus 100 where enhanced image data is produced. The image processor then causes the enhanced image data to be delivered to the print processing subsystem 92 via the third interface 128. Concurrently, control data or commands are received and responses to the host processor are transmitted via the second interface 142 without interfering the formatting of raw image data to enhanced image data. As a result, the addressing and control functions are separate, so as to not utilize the time on the apparatus 10 that could be used to transfer actual data. In one embodiment, the apparatus 10 of system 11 provides for a concurrent operation of the processor (such as an instruction fetched from the processor's EEPROM memory) at the same time the image data is being transferred from the host processing system 90 (e.g., IBM compatible) via the PCI bus to the pixel DRAM buffer, as further described herein.

FIG. 3 illustrates a preferred embodiment of the invention. Image data formatting card 100 includes three primary sections: image data bus 120, processor data bus section 140, and gateway section 160. Image data bus section 120 comprises most components through which image data flows as described below. Processor data bus section 140 comprises image processing components, which provide image processing functions over a relatively high speed bus. The processor data bus section 140 is implemented as a controller adapted to intercept raw image data and apply a transformative function to the raw image data to produce enhanced image data. The enhanced image data to be delivered to a print engine, or other similar print processing subsystem, for rendering on a receiver medium such as paper.

Gateway section 160 facilitates communication between image data bus section 120 and processor data bus section 140 in the manner described below.

Image data bus section 120 comprises a first interface, or image bus interface 122, which interfaces image data bus section 120 to a peripheral bus of the computer 90, as illustrated in FIG. 2. For example, if the computer 90 has a PCI bus, formatting card 100 can be in the form factor of a standard PCI card and image bus interface 122 will be a standard PCI interface. Image data bus section 120 also comprises front end RAM (random access memory) 124, back end RAM 126, and a third interface, or printer interface 128 associated with one or more printheads or print engines of the printer 92, as illustrated in FIG. 2.

In operation, printer interface 128 outputs data for the printheads or print engines in an appropriate protocol, such as Centronix serial, USB (universal serial bus), parallel, or the like, depending on the input interface of the printer 92. Front end RAM 124 and back end RAM 126 can each be a dual port SDRAM (synchronous dynamic random access memory) device. This permits data to be transferred into the memories at the same time it is transferred out at a very high speed. However, any appropriate type of memory device can be used as front end RAM 124 and back end RAM 126, such as VRAM, WRAM, RDRAM, SGRAM, DRAM, or any single or multiple port memory device. Communications between elements of image data bus section 120 are accomplished by an image data bus using known hardware and known protocols. For the sake of clarity, the connections between components are merely illustrated in a schematic manner.

Processor data bus section 140 comprises processor bus interface 142, such as a PCI interface, for example, that is similar to, but separate from, image bus interface 122, a PCI interface, for example. Processor bus section 140 also comprises processor 146, which receives processing instructions from the computer and transmits processing instructions to the computer. For example, processing instructions can include initialization commands, error information, diagnostic information, bad nozzle data for failed nozzle correction, and other instructions for processing a printjob. Processor 146 can be any type of digital processor that can be used for image processing, such as a POWER PC™ or INTEL™ i960 processor or INTEL pentium processor or Crusoe™ processor, each suitably programmed to perform image processing. Processor data bus section 140 also comprises ROM (read only memory) 148, which contains a print formatting process control program, and SRAM (static random access memory) 144, which serves as a workspace for image data being formatted by processor 146. Alternatively, ROM 148 can be replaced by any type of memory device that can retain the control program, such as a flash memory device, or the like.

Figure 4:
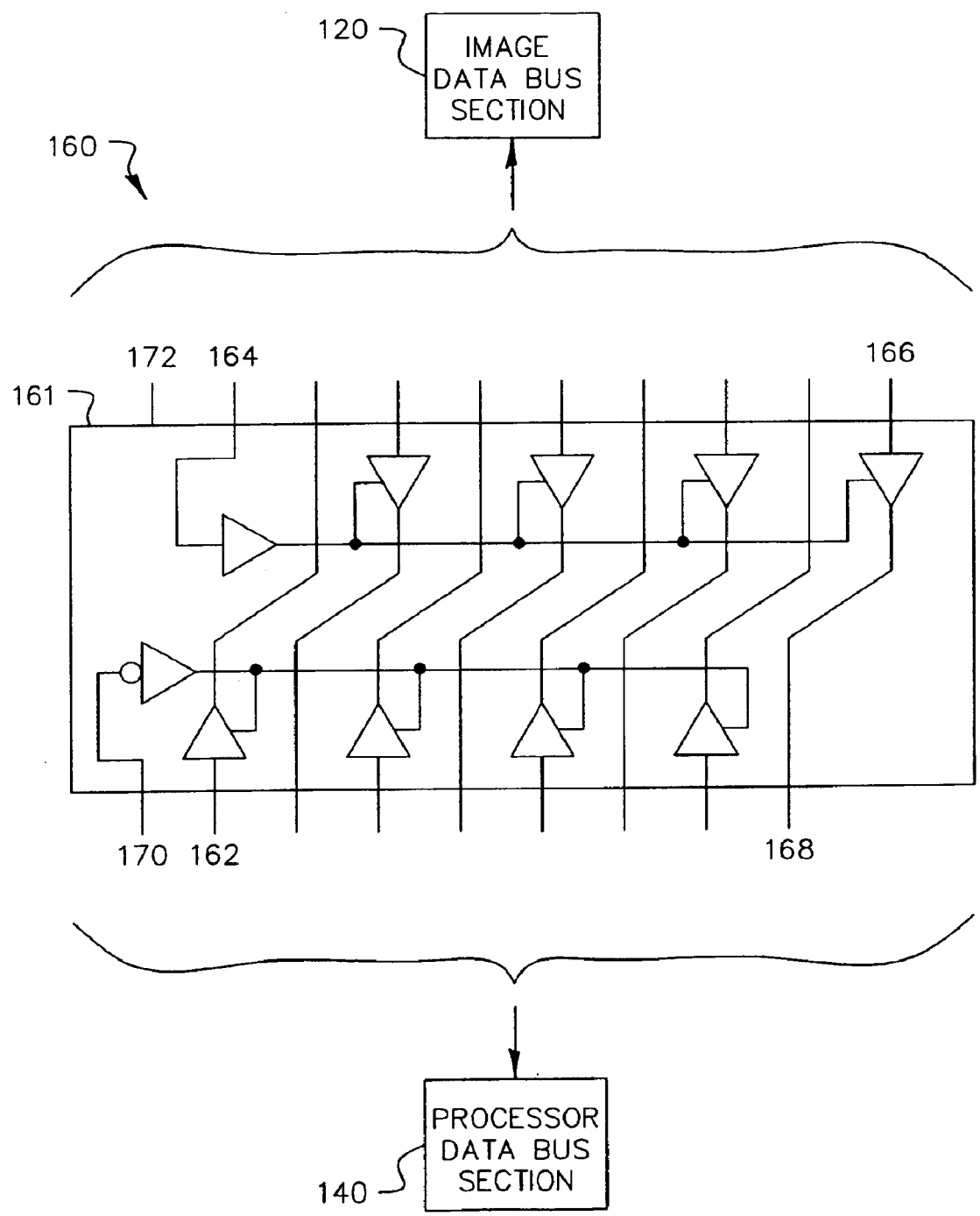
FIG. 4 is a block diagram of the gateway of the preferred embodiment.

FIG. 4 illustrates gateway 160 including transceiver 161. For example, transceiver 161 can be an IC 74HCT241 sold by National Semiconductor. Transceiver 161 serves as a buffer and as a repeater. As a buffer, transceiver 161 is configured to isolate image data bus section 120 and processor data bus section 140, while as a repeater, transceiver 161 receives, amplifies and retransmits signals between image data bus section 120 and processor data bus section 140. In the preferred embodiment, two data paths through transceiver 161 are used. The data path from input terminal 166 to output terminal 168 is used for data from front end RAM 124 to processor data bus section 140. Similarly, the data path from input terminal 162 to output terminal 164 is used for data from processor data bus section 140 to back end RAM 126. Of course, data flow is controlled by processor 146. In particular, processor 146 is coupled to terminals 170 and 172. Terminal 170 is used to activate that data path from terminal 162 to terminal 164, and terminal 172 is used to activate the data path from input terminal 166 to output terminal 168.

Transceiver 161 effectively "listens" to data asserted on the image data bus by front end RAM 124 and repeats what it "hears" at input terminal 166 on output terminal 168. The signal is buffered and thus the data path presents a relatively small amount of capacitance. Also, the signal is amplified (repeated) to provide good fidelity. Similarly, transceiver 161 effectively "listens" to data asserted on the processor data bus by processor RAM 144 and repeats what it "hears" at input terminal 162 on output terminal 164 to send data to back end RAM 126. The signal is buffered and thus the data path presents a relatively small amount of capacitance. Also, the signal is amplified (repeated) to provide good fidelity.

Transceiver 161 can be controlled by processor 146 to provide "half duplex" operation. In other words, data can only be sent in one direction (i.e. over one data path) at a time. Front end RAM 124 and back end RAM 126 need not arbitrate which device is asserting data on shared lines because the data moves on one general direction, i.e. out of front end RAM 124, to processor data bus section 140, and then to back end RAM 126. Note that transceiver 161 has additional data paths that are not used in the preferred embodiment. Transceiver 161 can be any device that has data paths that can be enabled and disabled selectively, present a relatively small capacitance to the circuit, and can transmit data with adequate fidelity.

In operation, a print initialization command (indicating that bitmapped data, such as a TIFF file., is to be printed) is generated by the computer 90 and sent to processor bus interface 142. Handshaking then occurs between processor 146 and the CPU of computer 90 to establish communications. In the meantime, image bus interface 122 is identified by a driver as a special bus write function and can begin to receive image data almost immediately and before the above-noted handshaking is completed. Accordingly, while the handshaking is occurring, the bitmapped image data begins to be loaded into front end RAM 124. Preferably, front end RAM 124 is sized to be able to hold data files that are likely to be transmitted for printing in their entirety. Therefore, once handshaking is completed and communications are established between processor 146 and the CPU of the computer 90, or very soon thereafter, processor 146 can begin to format the bitmapped image data. That is, the raw image data is formatted resulting in enhanced image data.

During an initialization procedure accomplished after the handshaking, instructions from an image processing control program are downloaded from ROM 148 to processor 146 in a known manner. By the time the instructions are downloaded, there may already be enough image data in front end RAM 124 to begin formatting. Otherwise, processor 146 will wait for enough data. Processor 146 then requests a block of image data from front end RAM 124 and reads the block out to processor RAM 144 through gateway 160. RAM 144 serves as a temporary workspace for formatting of the image data by processor 146 in a known manner. For example, the block of image data is subjected to a "pixel swath extraction" process and to a nozzle data rendering process during formatting. Front end RAM 124 operates in a FIFO (first in, first out) manner, and thus reading out of the block of image data to processor RAM 144 permits another block of image data to be loaded into front end RAM 124 if necessary.

Once the block of image data in processor RAM 144 is formatted, the formatted block of image data is read out of processor RAM 144 to back end RAM 126 across gateway 160. The formatted information can be stored in a buffer of back end RAM 126 associated with a particular nozzle head 128 based on the rendered nozzle data. This formatting procedure continues for subsequent blocks of data until all of the image data is formatted. When back end RAM 126 becomes full, or at any other appropriate time, the formatted image data can be read out of back end RAM 126 to interface 128 for generating a signal for the printheads of the printer 92. Back end RAM 126 can also operate in a FIFO (first in, first out) manner, and thus reading out of the block of image data to interface 128 permits another block of image data to be loaded into back end RAM 126, if necessary.

The local bus of processor bus section 140 is a high speed bus to facilitate image data formatting. However, it may be desirable to interface slower devices to the local bus. For example, Serial Port 152 may be used for debugging and other diagnostic purposes. In such a case, buffer 150 can be supplied between serial port 152, or any other slower device, and the local bus. Buffer 150 can be a transceiver similar to gateway 160.

It can be seen that separate buses and bus interfaces are used for most transmission of image data and for processing instructions. Therefore, image data can be transmitted from the computer 92 through the image bus interface 122 while the processor is initializing, receiving instructions, or otherwise communicating with the computer 90 through processor bus interface 142. The most utilized I/O operations, such as instruction fetches from the processor ROM 148 and stack-variable access out of processor RAM 144, have minimum wait states. Also, the processor communication bus section has a limited number of components and thus has less parasitic capacitance. Accordingly, the invention formats raw image data very quickly.

The various components can have any structure that accomplishes the disclosed functions. For example, the various memory devices can be of any appropriate type, such as ROM, RAM, flash memory, or subclasses thereof. The image processor can be of any type and the image processing control program can include any instructions needed to format or otherwise process the image data. The various interfaces can be of any appropriate type, depending on the communications bus of the computer 90 and the communication protocol of the printer 92. Various known hardware form factors and software communication protocols can be used with the invention. The invention can be applied to any type of printer or display.

Figure 5:
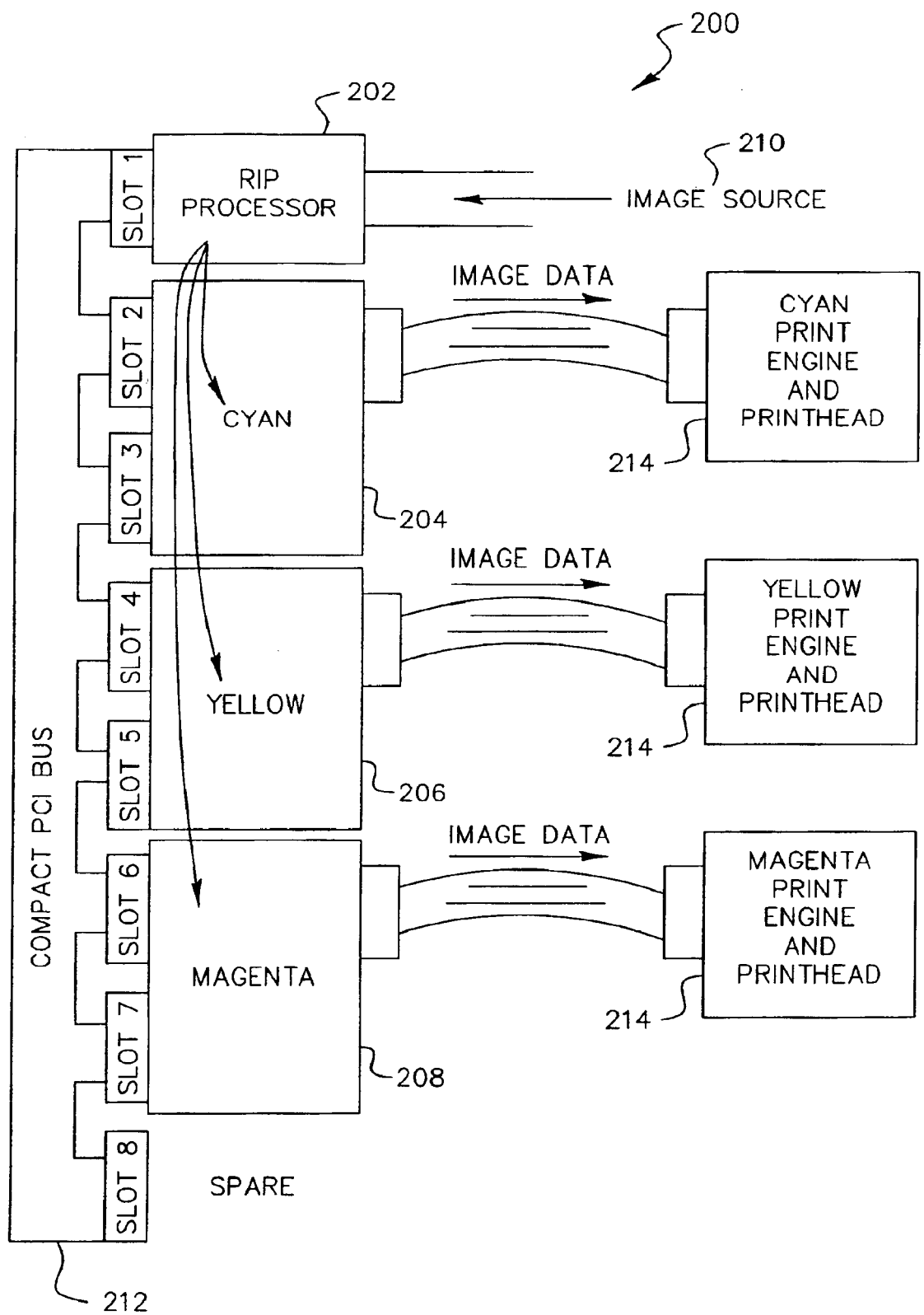
FIG. 5 illustrates the implementation of the present invention in a three-color image processing (printer) system utilizing a "band manager" board, in accordance with one embodiment of the present invention.

FIG. 5 illustrates the implementation of the present invention in a three-color image processing (printer) system utilizing a "band manager" board, denoted generally as 200, in accordance with one embodiment of the present invention. Initial color image processing of a TIF file would be done on an IBM compatible processor, for example. Currently, processing speed and the speed of presentation of the data to the band manager board 200 is driven by the access times of data from a hard disk, MIPS of the IBM compatible processor, speed of the PCI bus. Assuming that the system has a PCI bus speed of up to 66 MHz and that the color processing portion of the system will not be the limiting portion of the system in terms of system bandwidth, then it is essential to provide the band manager software with a platform to support a high data rate.

In operation, the image processor board 202 will acquire a TIF file video data or other image data 210 from a host processing system. The incoming image data 210 will have already been color corrected (i.e., converted from RGB to Cyan, Magenta, Yellow, etc.). Incoming data 210 will be ported onto the board 200 via the PCI bus 212. Formatted data is then output via a customized print engine (i.e., PEM) interface to a multitone board, such as that of FIG. 5.

The high-speed three-color system of FIG. 5 comprises a cyan board 204, a yellow board 206, and a magenta board 208. It should be understood that other color system configurations, with more or less color boards, may be utilized. In the example shown, the PCI bus 212 includes two slots for each board 204, 206, 208, so that two slots are used for cyan, two slots for yellow and two slots for magenta. In addition, one slot for the host (image) processing system 202, which assumes the functions of the processor bus section 140, is included, as well as one PCI slot position taken up as the host.

As the raw image data is received from the host processor, the shared compact PCI bus is adapted to transmit the raw image data to the individual boards via slots 1–8. If no I/O activity is present in a particular board, then that board is on "standby" mode. That is, each board is adapted to "listen" for when it is needed, and thus can activate and deactivate accordingly. Once the image data has been formatted or converted to enhanced image data, it is then transmitted via an interface to one or more print engines and printheads (e.g., cyan/yellow/magenta print engine and printhead).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

PARTS LIST

10 . . . conventional formatting apparatus
12 . . . bus interface
13 . . . communications bus
14 . . . local computer bus
16 . . . image processor
18 . . . print interface
90 . . . computer or host processing system
92 . . . printer or post processing subsystem
100 . . . image data formatting card
120 . . . image data bus section
122 . . . image bus interface or first interface
124 . . . front end RAM
126 . . . back end RAM
128 . . . print interface or third interface
140 . . . processor bus section
142 . . . processor bus interface or second interface
144 . . . processor RAM or SRAM
146 . . . image processor or processor
148 . . . ROM
150 . . . Buffer, control data buffer, or bus transceiver
152 . . . debug serial port or low speed communications device
154 . . . image data bus
156 . . . first local bus
158 . . . second local bus
160 . . . gateway
161 . . . transceiver
162 . . . input terminal
164 . . . output terminal
166 . . . input terminal
168 . . . output terminal
170 . . . terminal
172 . . . terminal

What is claimed is:

1. In connection with a host processing system capable of delivering commands and raw image data, an apparatus for formatting the raw image data and selectively delivering enhanced image data to a print processing subsystem, said apparatus comprising:
   a first interface coupled to said host processing system adapted for receiving said raw image data;
   a second interface coupled to said host processing system adapted for receiving said commands, the first interface and the second interface being independent of each other;
   a third interface coupled to said print processing subsystem; and
   a controller adapted to intercept said raw image data and apply a transformative function to said raw image data to produce enhanced image data and further to cause said enhanced image data to be delivered to said print processing subsystem via said third interface.

2. The apparatus according to claim 1 wherein said first interface is an image bus interface adapted to transmit said raw image data.

3. The apparatus according to claim 2 wherein said image bus interface is further identified as a special bus write function.

4. The apparatus according to claim 1 wherein said host processing system is selected from the group consisting of a Pentium™ processor, a Power Personal Computer (PC) type processor, and a Crusoe™ processor.

5. The apparatus according to claim 1 further comprising a front end memory coupled to said first interface, said front end memory adapted to receive said raw image data.

6. The apparatus according to claim 5 further comprising back end memory communicably coupled to said front end memory, said back end memory adapted to receive said enhanced image data.

7. The apparatus according to claim 6 wherein said front end memory and said back end memory are Random Access Memory (RAM).

8. The apparatus according to claim 6 wherein said third interface is a printer interface coupled to said back end memory, said printer interface adapted to transmit print data based on said enhanced image data to said print processing subsystem.

9. The apparatus according to claim 1 further comprising a processor adapted to receive processing instructions from said host processing system and transmit said processing instructions to said host processing system.

10. The apparatus according to claim 9 wherein said processing instructions include initialization commands, error information, diagnostic information, bad nozzle data for failed nozzle correction, and other instructions for processing a print job.

11. The apparatus according to claim 9 wherein said second interface is a processor bus interface coupled to said host processing system, said processor bus interface adapted to communicate said processing instructions between said processor and said host processing system.

12. The apparatus according to claim 9 further comprising a gateway communicably coupling said processor to said front end memory and said back end memory whereby said processor formats said raw image data as read out of said front end memory, and transmits said enhanced image data to said back end memory.

13. The apparatus according to claim 12 further comprising: an image data bus coupling said first interface to said front end memory; and
   a first local bus coupling said second interface to said processor;
   wherein said gateway communicably couples said image data bus and said first local bus.

14. The apparatus according to claim 13 further comprising:
   a control data buffer coupled to said first local bus;
   a low speed communications device in communication with said control data buffer; and
   a second local bus coupling said control data buffer and said low speed communications device.

15. The apparatus according to claim 14 wherein said control data buffer is a bus transceiver and said low speed communications device is a debug serial port.

16. The apparatus according to claim 9 wherein said processor is an image processor.

17. The apparatus according to claim 10 further comprising Read Only Memory (ROM) containing an image processing control program coupled to said image processor.

18. The apparatus according to claim 10 further comprising Random Access Memory (RAM) coupled to said image processor and serving as a workspace for formatting by said image processor.

19. The apparatus according to claim 1 wherein the first bus is used for transmission of image data signals from the host processing system.

20. The apparatus according to claim 19 wherein the second bus is used for transmission of processor instruction signals from the host processing system.

21. A device for formatting raw image data and selectively delivering enhanced image data to a print processing subsystem, said device comprising:
   an image data bus section having an image bus interface adapted to be coupled to a host processing system to transmit the raw image data, a front end memory coupled to said image bus interface to receive said raw image data, a back end memory for receiving said enhanced image data, and a print interface coupled to said back end memory for transmitting print data based on said enhanced image data as read out of said front end memory and transmitting the enhanced image data to said print processing subsystem;
   a processor bus section having an image processor, a processor bus interface adapted to be coupled to said host processing system to communicate print processing instructions between said image processor and said host processing system, the processor bus interface being independent of the image bus interface, the processor bus interface and the image bus interface operating in parallel; and
   a gateway coupling said image processor to said front end memory and said back end memory whereby said image processor formats said raw image data and transmits said enhanced image data to the back end memory.

22. The device according to claim 21 wherein said image bus interface is identified as a special bus write function.

23. The device according to claim 21 wherein handshaking between said image processor and said host processing system is accomplished through said processor bus interface.

24. The device according to claim 21 further comprising Read Only Memory (ROM) containing an image processing control program coupled to said image processor.

25. The device according to claim 21 further comprising Random Access Memory (RAM) coupled to said image processor and serving as a workspace for formatting said raw image data by said image processor.

26. The device according to claim 21 further comprising:
   an image data bus coupling said image bus interface to said front end memory; and
   a local bus coupling said processor bus interface to said image processor;
   wherein said gateway couples said image data bus and said local bus.

27. An apparatus as recited in claim 26 further comprising a buffer coupled to said local bus and a low speed communications device coupled to said buffer.

28. The device according to claim 21 wherein said print interface is adapted to output data to a plurality of printheads via said print processing subsystem.

29. A method for formatting bitmapped image data comprising the steps of:
   transmitting raw image data, through an image bus interface coupled to a host processing system, to a front end memory coupled to the image bus interface for receiving said raw image data;
   communicating print processing instructions, through a processor bus interface coupled to said host processing system, to an image processor, the processor bus interface being independent of the image bus interface, the processor bus interface and the image bus interface connected in parallel to the host processing system;
   transferring said raw image data from the front end memory to the print processor through a gateway coupling the print processor to the front end memory;
   formatting the raw image data via said image processor;
   transferring enhanced image data to a back end memory;
   reading said enhanced image data out of said back end memory; and
   transmitting said enhanced image data readout from the back end memory to a print processing subsystem via a print interface.

30. The method according to claim 29 further comprising the step of downloading control instructions from a Read Only Memory (ROM) to the image processor.

31. The method according to claim 29 further comprising the step of receiving command instructions from a second local bus.

32. The method according to claim 29 wherein said formatting step includes the step of utilizing a Random Access Memory (RAM) coupled to the image processor as a workspace.

33. The method according to claim 29 further comprising the step of dividing said enhanced image data into data for a plurality of printheads in said print interface.

34. The method according to claim 29 wherein said step of transmitting said enhanced image data readout from the back end memory to a print processing subsystem via a print interface is followed by the step of delivering said enhanced image data to a plurality of printheads.

35. The method according to claim 29 further comprising the step of identifying the image bus interface as a special bus write function.

36. The method according to claim 35 further comprising the step of accomplishing handshaking between the image processor and said host processing system through the processor bus interface.

* * * * *